United States Patent
Magrino et al.

(10) Patent No.: US 7,437,309 B2
(45) Date of Patent: Oct. 14, 2008

(54) TALENT MANAGEMENT SYSTEM AND METHODS FOR REVIEWING AND QUALIFYING A WORKFORCE UTILIZING CATEGORIZED AND FREE-FORM TEXT DATA

(75) Inventors: Susan A. Magrino, Pacifica, CA (US); Edward J. Huser, San Francisco, CA (US); Priscilla Joyce, San Jose, CA (US); Lori Lee Levers, Palo Alto, CA (US); James Daughton, San Francisco, CA (US); Stella G. Lewis, Roseville, CA (US); Jan Lowe, Millbrae, CA (US); Natasha Rabey, San Francisco, CA (US); Angela Savella, Antioch, CA (US); Patricia Swatzell, Lafayette, CA (US)

(73) Assignee: Corporate Fables, Inc., Burlingame, CA (US)

( * ) Notice: Subject to any disclaimer, the term of this patent is extended or adjusted under 35 U.S.C. 154(b) by 812 days.

(21) Appl. No.: 10/079,024

(22) Filed: Feb. 20, 2002

(65) Prior Publication Data
US 2002/0198766 A1    Dec. 26, 2002

Related U.S. Application Data

(60) Provisional application No. 60/270,493, filed on Feb. 22, 2001, provisional application No. 60/270,562, filed on Feb. 22, 2001.

(51) Int. Cl.
G06F 11/34    (2006.01)
(52) U.S. Cl. .................................................. 705/11
(58) Field of Classification Search .............. 705/11
See application file for complete search history.

(56) References Cited

U.S. PATENT DOCUMENTS 5,117,353 A * 5/1992 Stipanovich et al. .......... 705/11

(Continued)

FOREIGN PATENT DOCUMENTS

WO    WO 99/17242    * 4/1999

OTHER PUBLICATIONS

"There are a million stories in the workplace, CareerFables.com wants your . . . ", www.careerfables.com News, Feb. 2, 2000.*
"CareerFables.com redefines how to qualify a Job Candidate with the SkillsMatch", PR Newswire, Jul. 20, 2000.*
Hyatt, Joshua, Two-Timers Inc; Apr. 1988, vol. 10, No. 4, pp. 133, 135.*

(Continued)

Primary Examiner—Scott L Jarrett
(74) Attorney, Agent, or Firm—NewTechLaw; Gerald B. Rosenberg, Esq.

(57) ABSTRACT

A computer based human capital management system provides for collecting information from any combination of position applicants, employees, and reserve pool talent reflective of the position skills, performance, and requirements thereof. The quality of the collected information can be normalized by supervisory review. The collected information is searchable by skill, performance, and other requirements with the search results being scored and ranked. The collected information may also be evaluated against a position specification establishing a weighting profile reflective of a position skills, performance, and requirements set presumed appropriate for a defined position. The position evaluation returns a scored and ranked list of candidates for the defined position, which can then be subjected to managerial review. Additional information can be requested as part of the managerial review, leading to a potential revision in the scored and ranked list of candidates.

3 Claims, 5 Drawing Sheets

U.S. PATENT DOCUMENTS

| | | | | |
|---|---|---|---|---|
| 5,164,897 | A | * | 11/1992 | Clark et al. .................... 705/1 |
| 5,315,504 | A | * | 5/1994 | Lemble ....................... 700/90 |
| 5,592,375 | A | | 1/1997 | Salmon et al. |
| 5,706,452 | A | * | 1/1998 | Ivanov ....................... 715/751 |
| 5,832,497 | A | * | 11/1998 | Taylor ..................... 707/104.1 |
| 5,999,939 | A | * | 12/1999 | de Hilster et al. ........... 707/102 |
| 6,049,776 | A | | 4/2000 | Donnelly et al. |
| 6,070,143 | A | | 5/2000 | Barney et al. |
| 6,119,097 | A | * | 9/2000 | Ibarra .......................... 705/11 |
| 6,266,659 | B1 | * | 7/2001 | Nadkarni ....................... 707/3 |
| 6,272,467 | B1 | * | 8/2001 | Durand et al. ................. 705/1 |
| 6,275,812 | B1 | * | 8/2001 | Haq et al. ..................... 705/11 |
| 6,279,042 | B1 | * | 8/2001 | Ouchi ....................... 709/240 |
| 6,289,340 | B1 | * | 9/2001 | Puram et al. ................... 707/5 |
| 6,370,510 | B1 | * | 4/2002 | McGovern et al. ............. 705/1 |
| 6,385,620 | B1 | * | 5/2002 | Kurzius et al. ........... 707/104.1 |
| 6,524,109 | B1 | * | 2/2003 | Lacy et al. .................. 434/219 |
| 6,604,084 | B1 | * | 8/2003 | Powers et al. ................. 705/11 |
| 6,691,133 | B1 | * | 2/2004 | Rieffanaugh, Jr. ........ 707/104.1 |
| 6,728,695 | B1 | * | 4/2004 | Pathria et al. .................. 707/2 |
| 6,735,570 | B1 | * | 5/2004 | Lacy et al. ..................... 705/7 |
| 6,996,561 | B2 | * | 2/2006 | de Hilster et al. ............. 707/6 |
| 7,080,057 | B2 | * | 7/2006 | Scarborough et al. ......... 706/60 |
| 7,149,703 | B2 | * | 12/2006 | Younger ....................... 705/9 |
| 7,191,139 | B2 | * | 3/2007 | Roy et al. ...................... 705/1 |
| 7,219,066 | B2 | * | 5/2007 | Parks et al. .................... 705/1 |
| 7,249,145 | B1 | * | 7/2007 | Rock et al. ................ 707/104.1 |
| 7,310,626 | B2 | * | 12/2007 | Scarborough et al. ......... 706/60 |
| 2001/0034011 | A1 | * | 10/2001 | Bouchard ................... 434/236 |
| 2001/0034630 | A1 | * | 10/2001 | Mayer et al. .................... 705/7 |
| 2001/0042000 | A1 | * | 11/2001 | Defoor, Jr. ..................... 705/9 |
| 2002/0019765 | A1 | * | 2/2002 | Mann et al. ................... 705/11 |
| 2002/0046074 | A1 | * | 4/2002 | Barton .......................... 705/8 |
| 2002/0055866 | A1 | * | 5/2002 | Dewar .......................... 705/8 |
| 2002/0055870 | A1 | * | 5/2002 | Thomas ....................... 705/10 |
| 2002/0069080 | A1 | * | 6/2002 | Roy et al. ...................... 705/1 |
| 2002/0133369 | A1 | * | 9/2002 | Johnson ........................ 705/1 |
| 2003/0191680 | A1 | * | 10/2003 | Dewar .......................... 705/8 |

OTHER PUBLICATIONS

Clyde, Stephen et al., An object-oriented implementation of an adaptive classification of job openings 11th Conference on Artificial Intelligence for Applications, IEEE, 1995, pp. 9-16.*

Sullivan S.E. et al., Recruiting and Retaining Older Workers for the New Millennium Business Horizons, vol. 40, No. 6, Nov. 1997, pp. 65-69.*

LensXray Product Brochure Burning Glass Technologies, 2001.*

Job Mailbag Record, Mar. 21, 1994.*

Restrac annouces Restrac Hire 3.0 Business Wire, Mar. 5, 1996.*

New Lawson Recruitment Release Boosts E-Business Functionalityl ijob Version 3.2 Business Wire, Sep. 28, 1999.*

Webhire Broadens Recruiting Solutions with Online Extension for Hiring Managers Business Wire, Nov. 16, 1999.*

BrassRing Systems Partners with SAP AG to Develop mySap.com Recruitment Solution PR Newswire, Apr. 24, 2000.*

Dickmeyer, William, The Basics of Applicant Tracking Systems Workforce, vol. 80, No. 1, Jan. 2001.*

* cited by examiner

TALENT MANAGEMENT SYSTEM AND METHODS FOR REVIEWING AND QUALIFYING A WORKFORCE UTILIZING CATEGORIZED AND FREE-FORM TEXT DATA

This application claims the benefit of U.S. Provisional Application No(s). 60/270,493 and 60/270,562, filed Feb. 22, 2001.

CROSS-REFERENCE TO RELATED APPLICATIONS

The present application is related to the following Application, assigned to the Assignee of the present Application: Human Capital Management Performance Capability Matching System and Methods, Magrino et al., filed concurrently herewith.

BACKGROUND OF THE INVENTION

1. Field of the Invention

The present invention is generally related to computer-based human resource (HR) management systems and, in particular, to a computer automated system implementing a comprehensive workforce-directed, human capital management inventory, search, and position matching capability.

2. Description of the Related Art

The cost and complexity, and therefore need, to effectively manage human resources has been long recognized. With increasingly sophisticated workforces of correspondingly increasing accumulated value, the process of acquiring, training, managing, and retaining a workforce, if effective, can preserve and deliver substantial value to workforce organizations, including employer companies and volunteer agencies. Given the ever increasing business and product development cycle rates and the scale and complexity of specialized workforce knowledge, the need for an efficient human capital management (HCM) system is likewise only increasing.

Existing human resource oriented systems generally fail, however, to provide a comprehensive system for managing and maintaining workforces in contemporary workforce environments. Due to the evident intrinsic complexity of human capital management, organizational management typically delegates the entirety of the HCM process to the human resources group of an organization. Conventional computerized HR groups accept this delegation as a design assumption for the HCM processes implemented. Such conventional systems are thus maintained largely separate from the workforce. As a consequence, the tools provided by the HCM system may not be utilized fully, or may even be ignored, due to the remoteness of the HCM function, unfamiliarity with the tools, and not uncommonly a distrust of the integrity of the data carried by the HCM system.

To compensate, relatively large efforts are required to maintain and update the data carried by the HCM system and independently train managers within the organization in the use of the HCM tools. In addition to the necessary ongoing costs for such efforts, the capital and operating costs, including initial customization and installation as well as ongoing maintenance, for conventional HCM systems are considerable. As a result, the management, training, and cost overhead of conventional HCM systems can be prohibitive for small and medium sized organizations and quite burdensome even for organizations on the order of a thousand to many thousands of employees.

Another common characteristic of conventional HCM systems is that such systems are typically designed to implement highly detailed and controlled management function processes. Members of a workforce of any significant size are viewed as being entirely subject to rigid categorization, on the assumption that the categorization is well-designed. In practice, however, typical HCM systems tend to fit members of the workforce into available categories often independently pre-established during some initial design of the HCM system. As a result, the often valuable uniqueness of many members of the workforce, which may not have been recognized or even existent at the time the categorization was developed, is lost to the HCM system. Such information, particularly where the information concerns newly developing skill areas, is further lost to the management processes that rely on the HCM system to best evaluate and deploy members of the workforce. While system reprogramming is possible, though costly and time consuming, the intrinsic and progressive variability of workforce skills will inevitably lead the ability to update the categorization capabilities of conventional HCM systems. Consequently, the timeliness and therefore integrity of the data carried by conventional HCM systems will always be fundamentally compromised.

An example of a rigid categorization system is presented in U.S. Pat. No. 6,275,812, issued to Haq et al. The HCM system described in Haq et al. establishes a highly controlled approach to allocating members of an established, comprehensively cataloged workforce to equally well-cataloged projects. The detailed skills of each workforce member is presumed to be fully and uniformly assessed on skills templates. Each project is equally defined in terms of the detailed project requirements needed by a project team member, as reflected on a corresponding project template. The HCM system of Haq et al. then operates to match skill templates against project templates subject to a project skills weighting profile.

The matching process described in Haq et al. specifically operates to identify those workforce members whose skills exactly match the weighted profile skills of a desired project team member. Additional skills and skills not explicitly recognized by the system are ignored in their entirety. Clearly, potentially valuable attributes of a workforce member not easily subject to strict, pre-emptive categorization are also ignored. As a result, the preemptive definition of a project team member skills and screening of candidate skill templates on an absolute scale against the project templates results in a very rigid and exacting evaluation of candidates.

While such an exacting evaluation is the stated goal of the Haq et al. HCM system, there are many limitations of such a system. As acknowledged in Haq et al., a sophisticated skill assessment is a requirement for the accurate operation of the described HCM system. The initial skills assessment is made, however, apparently unilaterally by the workforce members. The evaluation made by the Haq et al. system is therefore dependent on the inherent variability of the self-assessments. Thus, while the Haq et al. system may fairly represent the workforce in the aggregate, the fundamental ability to exactly identify "best" candidates for specific projects is extremely limited.

Even if the skills data collected by Haq et al. could be maintained in some way continuously with some degree of confidence in the quality of the data, the rigid definition of positions likely results in a questionable identification of the best qualified workforce members for inclusion on the team. The factors that may define a best fit for members of a team are, as is fundamental to human nature, not reflected by an identity of rigidly-defined, objectively defined set of existing skills. Rather, managerial or other qualified, subjective evaluations may provide substantial forward-looking value in identifying the best candidates for participation on a project team. The Haq et al. HCM system, however, precludes, as a stated objective, any such subjective contribution to the HCM system based selection process. The effect then is, as is characteristic of other conventional HCM systems, a lack of intrinsic confidence in the integrity in the underlying data as well as operation of the system, processes, and tools.

Consequently, there is a clear need for an HCM system that supports human capital management and planning in connection with a workforce in a manner that is continuously, reasonably and cost-effectively maintainable, and that operates inclusively to build confidence in the operational integrity of the system, process, and tools.

SUMMARY OF THE INVENTION

Thus, a general purpose of the present invention is to provide an efficient human capital management system that is comprehensive to the workforce, intrinsically develops workforce information with a high degree of quality, and provides inclusively operating managerial tools.

This is achieved in the present invention by providing, executed as a computer based human capital management system, a system of collecting position skills, past performance, and future requirements information from any combination of applicants, employees, and reserve pool talent. The quality of the collected information can be preferably normalized by screening, managerial, and supervisory review. The collected information may be directly searched by skill, performance, and requirements with the search results being scored and ranked. The collected information may also be evaluated against a position specification establishing a weighting profile reflective of position skills, performance, and requirements set presumed appropriate for a defined position. The position evaluation returns a scored and ranked list of candidates for the defined position, which can then be subjected to managerial review. Additional information can be requested as part of the managerial review, leading to a potential revision in the scored and ranked list of candidates.

In the collection and scoring of information, free-form text fields are preferably provided in addition to fixed text fields to allow a potential candidate to well characterize their position skills, performance, and requirements in addition to as well as beyond the defined categorizations available through fixed and categorized text field entries. The present invention provides for the content evaluation of free-form text fields to identify any relevant position skills, performance, and requirements identifiers provided by a potential candidate. Such identified information is, in turn, scored and included in the final scored ranking of the potential candidates for the defined position.

An advantage of the present invention is that the human capital management system provides for a comprehensive collection and evaluation of information. The information collection methodology implemented by the computer-based application of the present invention supports and encourages closed-loop involvement of both applicant-side and management-side users. Breadth and depth-wise integrity of the information collected is continually reinforced, leading to improved use and usability of the system.

Another advantage of the present invention is that the multiple review processes are supported to increase and normalize the quality of data maintained by the system. Managerial-side reviews of provided information permit the up-grading of provided information based on an increased confidence of correctness. Closed-loop involvement of the information providers in connection with managerial-size reviews further increases both the quantity and quality of the information contained by the system.

A further advantage of the present invention is that the system accepts the applicant-side identification of performance capabilities through both categorized and free-form description. Applicant-side specification of categorized performance capabilities directly provides for the capture of structured information. Specification of performance capabilities through open or free-form descriptions enables capture of performance capabilities not necessarily reflected directly in the pre-established specification of categorized performance capabilities. A greater and more timely range of performance capability information is therefore captured through a greater variability in the recognition of performance capabilities.

Still another advantage of the present invention is that a highly configurable scoring system provides a basis for evaluating the performance capabilities of candidates relative to positions specifications. In particular, open descriptions of performance capabilities are evaluated closely to recognize categorizeable performance capabilities, which are then included in the scoring process. The scoring system therefore flexibly recognizes a structured, yet open specification of performance capabilities, which results in an improved basis for the ranking of candidates against position specifications.

Yet another advantage of the present invention is that the system provides for the flexible association of weights with different identifiable position qualifications, not limited to skills performance. Weight sets are preferably associated with the performance capability items within position specifications.

Still another advantage of the present invention is that the system architecture supporting the operation of the human capital management system is easily customized, both in appearance and the specific operation of the system. In particular, system customization enables selection and alternate specification of the categorized and open description information that may be collected. Thus, in all modes of operation, users are presented with contextually correct information and controls.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein.

DETAILED DESCRIPTION OF THE INVENTION

In connection with the present invention, human capital management (HCM) is defined as a process of harnessing the accumulated value present in a workforce, including new applicants, existing employees, consultants, and active participants, and a reserve talent pool of prior and retired employees, including past consultants and other participants. The value is harnessed through a systematic identification of the different work preferences, goals, skills, and accomplishments of the different individuals within the workforce. These work preferences, skills, accomplishments, and other work and life-style attributes of the individual, together reflecting the value of the individual as a member of the workforce, are collectively referred to as performance capabilities. The process of human capital management provides this collected performance capability information to managers or others responsible for the allocation of the workforce in a manner that permits a rational and best organizational use of the workforce members within some defined organization. In accordance with the present invention, an organization may be a company, or one or more divisions or groups thereof, or an agency or group of agencies or companies that may draw on a common workforce of paid and volunteer participants having diverse talents and capabilities.

Figure 1:
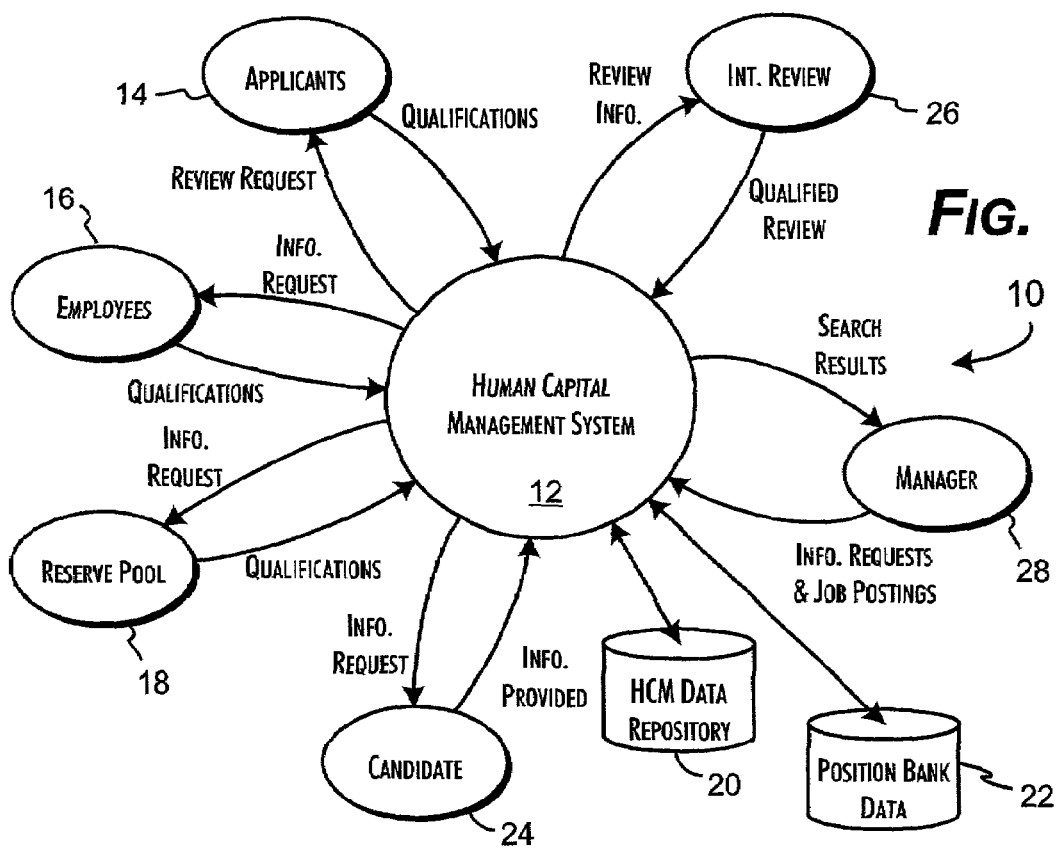
FIG. 1 provides a top-view illustration of the providers, stores and consumers of human capital management information in a computer-based system constructed in accordance with the present invention.

In accordance with the present invention, as shown in FIG. 1, a comprehensive closed-loop system 10 supports the interaction of the workforce with a human capital management (HCM) system 12. Rather than acting indirectly through a human resources department or submitting data that is then independently entered and reviewed, the HCM system 12 supports the direct and closed-loop interaction of new applicants 14, employees 16, and members of the reserve talent pool 18 with their performance capabilities data sets, as stored in an HCM data repository 20.

Through the HCM system 12, applicants 14, employees 16, members of the reserve talent pool 18 can view, as appropriate to their status, the posting of job positions represented by position specifications records within a positions bank database 22. By submission of a request to be considered for a position or search conducted by a manager, an applicant 14, employee 16, or member of the reserve talent pool 18 is preferably considered a candidate 24.

In response to changes in performance capability data sets, various data integrity checks are supported through the HCM system 12. The checks may be initiated in response to the creation and modification of performance capability data sets and position consideration requests. The checks are preferably performed by human resource or other internal reviewers 26, to assure basic data set completeness and validity, as well as peremptory suitability of a candidate consideration request, and by managerial level-reviewers 28, for substantive consideration of data set changes and candidate position consideration requests.

In response to the submissions of new and revised performance capabilities, the HCM system 12 preferably provides issuance of electronic notices to conduct checks and review requests, as appropriate, to the internal reviewers 26, and managers 28. Responsive requests for clarifications, additions, and other modifications to the HCM repository 20 stored data sets can then be issued through the HCM system 12, again preferably as electronic notices, to specific applicants 14, employees 16, and members of the reserve talent pool 18. As the status of the applicants 14, employees 16, and members of the reserve talent pool 18 change, further electronic notices are, preferably automatically, generated by the HCM system 12 and sent to designated addresses to confirm the changes to the applicants 14, employees 16, and members of the reserve talent pool 18 and notify human resources, facilities management, and other appropriate departments within the organization of the change in status.

Figure 2:
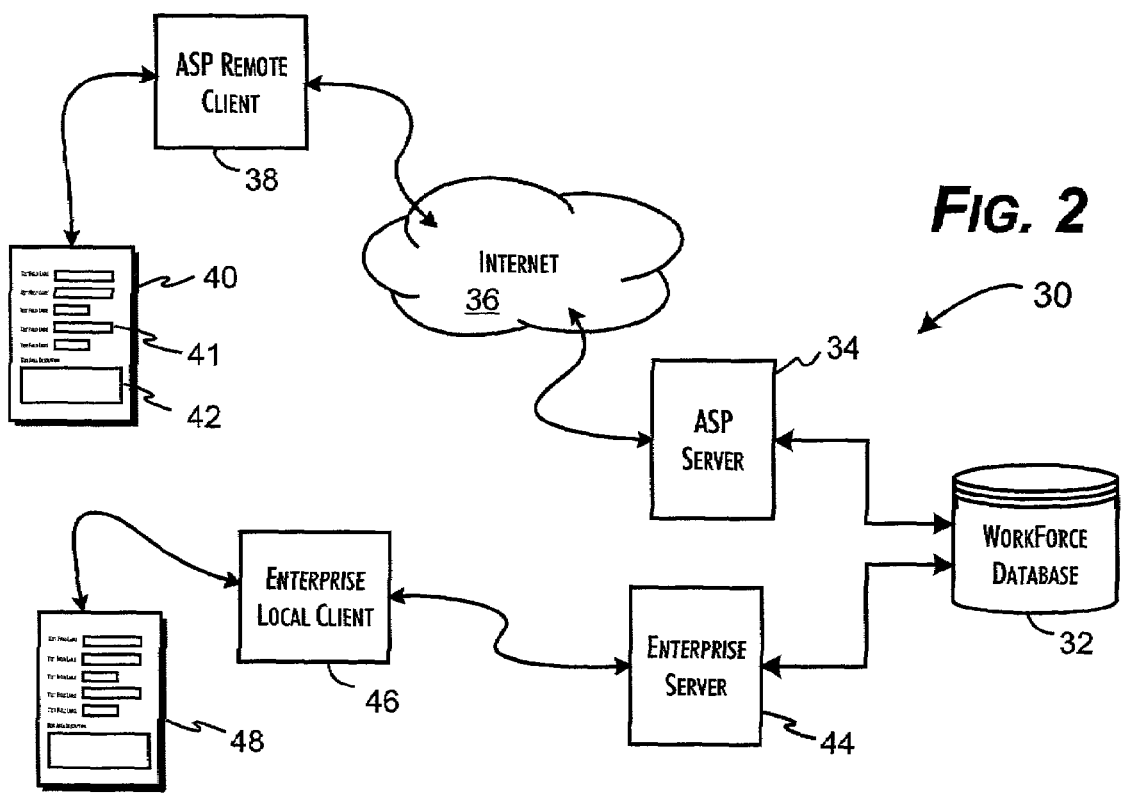
FIG. 2 provides an operations diagram illustrating the preferred multiple modes of interacting with the human capital management system of the present invention.

The preferred embodiments of the HCM system 12 include an application specific provider (ASP) model and an enterprise model, generally as shown in FIG. 2, which can be run separately or concurrently depending on the configuration best suited for support of any particular workforce. As shown, a concurrent system 30 implements a workforce database 32, which is comprehensive to the HCM data repository 20 and position bank database 22. An ASP server 34, which executes an application implementing the HCM system 12 processes, supports light-weight, typically HTTP-based, data connections through the Internet 36 established from HTTP-browser based ASP remote clients 38. Conventional password protected login and encrypted data transport protocols are implemented between the ASP remote client 38 and ASP server 34. The remote clients 38 preferably present form-based Web pages 40, containing text fields 41 and areas 42, for the review and modification of HCM repository 20 stored data sets.

An enterprise server 44 similarly provides for the execution of an application implementing the HCM system 12 processes. Enterprise local clients 46 preferably access the enterprise server 40 through intranet connections to utilize form-based Web pages 48 for the review and modification of HCM repository 20 stored data sets. While possibly of less significant need, password protected login and encrypted data transport protocols are again preferably used to secure the data between the clients 46 and enterprise server 44.

Figure 3:
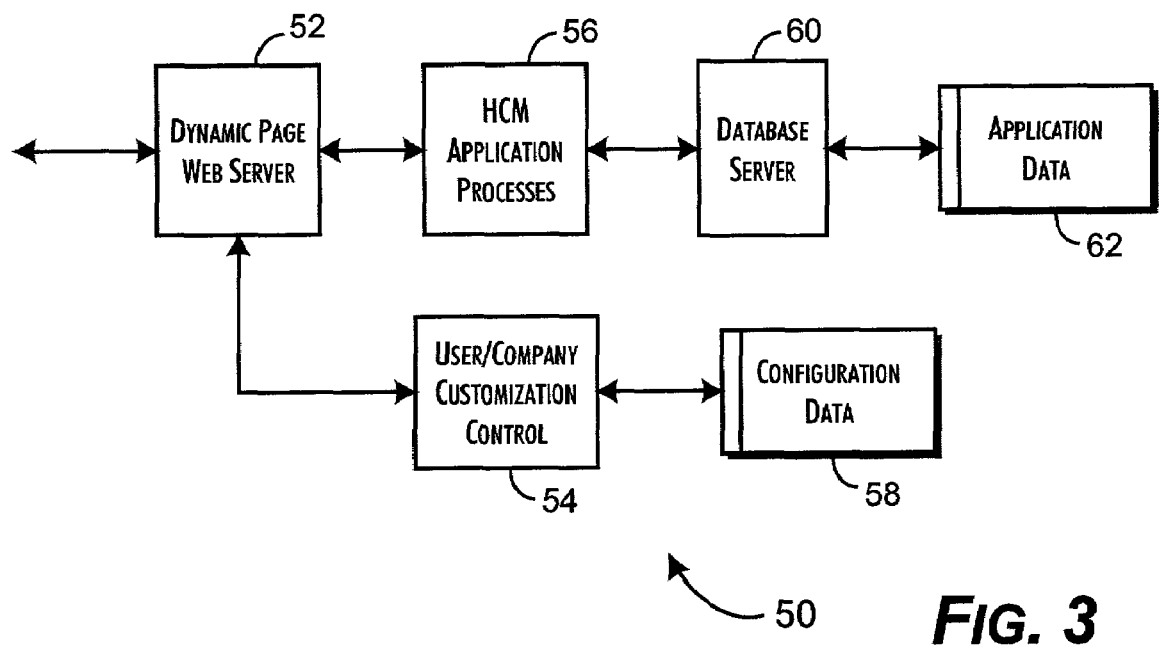
FIG. 3 is a block diagram showing the multi-tiered and configurable computer system structure of a preferred embodiment of the present invention.

The architecture of the ASP server 34 and enterprise server 44 preferably supports customization of the presentation of the HCM system 12 through a dynamic generation of screen forms through which performance capability data sets and other information can be viewed and modified. A dynamic application presentation system 50 constructed in accordance with a preferred embodiment of the present invention is shown in FIG. 3. A dynamic web page server 52, implemented using Microsoft® Application Server Pages technologies in combination with Visual Basic® and JavaScript™ integrates a parameter-driven description of the HCM system 12 presentation, as provided through a customization control 54, with an HCM system 12 process management application 56. JavaServer Pages™ (JSP) and other developing technologies could also be used.

The customization control 54 preferably determines, based on the login identity and optionally on the URL reference to the Web server 52, a defined set of presentation fields that can be viewed and accessed by the user. The on-screen appearance, field titles and related text, category choice options, and other attributes of the presentation of the HCM system 12 are also defined, all based on configuration data 58 stored within the workforce database 32. This allows implementations of the present invention to present at least the appearance of a distinct, fully customized HCM system 12 application for any number of different workforce organizations, divisions, or groups.

The HCM system 12 process management application 56 is preferably executable as a separate application tier. Based on user interactions provided from the Web server 52, the process management application 56 manipulates the provided data and, as appropriate, interacts with a database server 60 to access application data 62, HCM repository data, and other data within the workforce database 32.

Figure 4:
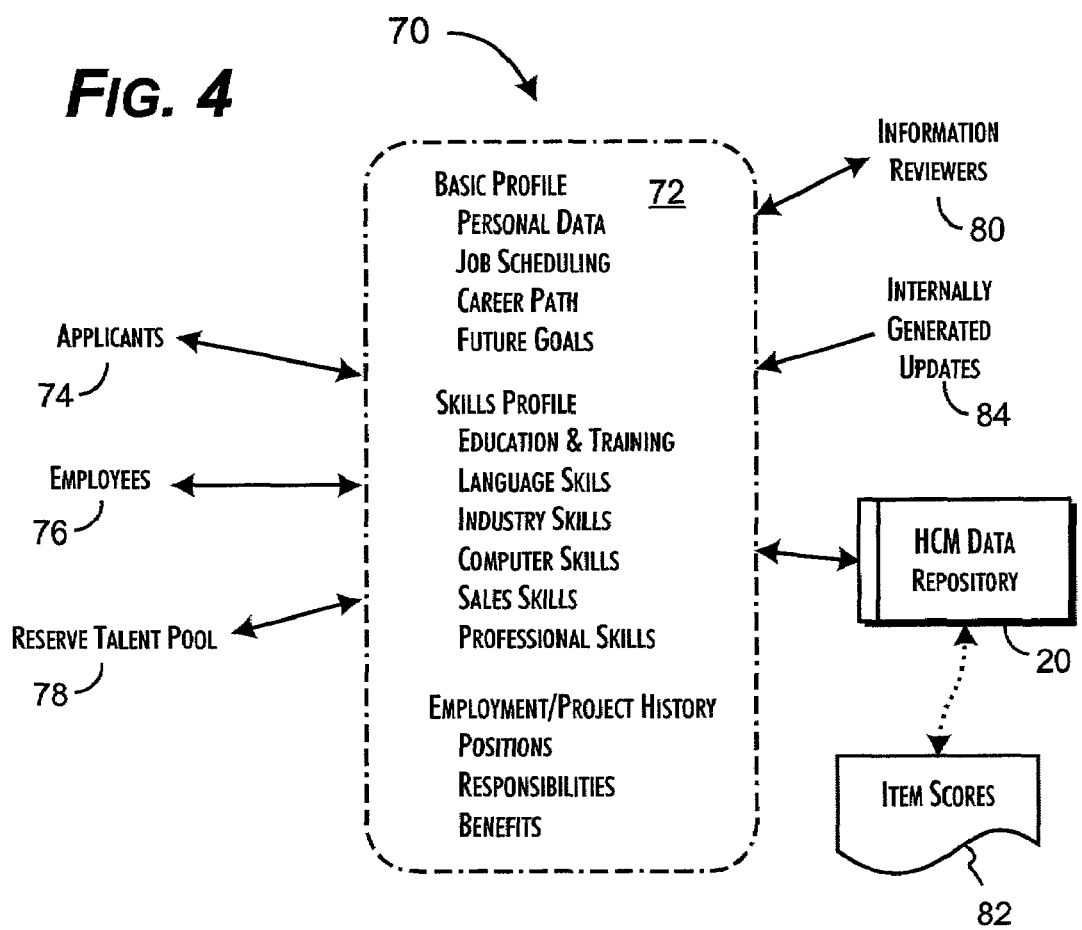
FIG. 4 provides a representation of the data captured and stored by the human capital management information system of the present invention.

As generally indicated in FIG. 4, the HCM system 12 process management application 56 supports for the collection, review, and modification of a wide variety of detailed performance capabilities 72. Primary performance capability information is collected from applicants 74, employees 76, and members of the reserve talent pool 78 and stored in the HCM data repository 20. In the preferred embodiments of the present invention, managerial-level reviews 80 are utilized to elicit further additional and qualified primary information from the applicants 74, employees 76, and members of the reserve talent pool 78. In review of an existing performance capability data set, a managerial-level review 80 can produce electronic or other notifications to the corresponding applicant 74, employee 76, or members of the reserve talent pool 78 to add or update their performance capability data set. In the preferred embodiments of the present invention, such managerial-level reviews 80 do not directly change the substantive content of performance capability data sets. Only the applicants 74, employees 76, and members of the reserve talent pool 78 are permitted to make such changes.

A managerial-level reviewer 80, however, is permitted to reflect a concurrence in each reviewed performance capability data set as a basis for enhancing the scoring of the reviewed performance capability data set to reflect an increased confidence in the quality and integrity of the information represented by the data set. In the preferred embodiments of the present invention, items of a performance capability data set can be either scored or unscored data. Each element of scored data preferably represents some specific performance capability, such as a knowledge skill. Unscored data may be an address or other performance capability not considered directly relevant to the substantive evaluation of an applicant 74, employee 76, or member of the reserve talent pool 78 relative to a position specification. Information that may be only indirectly or subjectively relevant to a substantive evaluation, such as statements of generalized accomplishments and achievements may also be maintained as unscored data. While such unscored data items do not participate in the scored ranking of candidates, this information is visible in free-text searches executed against the contents of HCM repository 20 stored data sets. Unscored information is thus maintained within the HCM system 12 as a valuable potential basis for identifying potential candidates. Preferably, each scored data item of a performance capability data set can be annotated to reflect at least one level of reviewed or unreviewed status. Optionally, unscored data items can also be marked with a reviewed or unreviewed status.

Scored data items each preferably have an associated item score reflected by a numeric value. Where a scored data item may be further qualified by a set of item scores rankings, such as low, medium, high, or other ranking set, each ranking level preferably also has a corresponding assigned numerical value. Each review status level is also assigned a numerical value. These presence, ranking, and review values are preferably stored in an item scores table 82 within the workforce database 32 for reference whenever a particular performance capability data set is evaluated. Upon evaluation, in accordance with the present invention, the item score for a particular item of a performance capability data set is determined as a function of the item presence, ranking and review values. In a preferred embodiment of the present invention, this function is a direct summation of the associated numerical values.

Secondary performance capability information can be collected from internally generated updates 84 and, in an alternate embodiment of the present invention, managerial evaluations 80. The internally generated updates 80 preferably reflect the automated updating of performance capabilities data sets in response to objectively factual events, such as the hiring of an applicant, the promotion of an employee, or the retirement and consequential addition of the employee to the reserve talent pool. In a preferred embodiment of the present invention, such events are recognized by the HCM system 12 process management application 56 in connection with the issuance of corresponding electronic notices by managerial-level members of the workforce, such as the engagement of a candidate relative to a position specification or an acknowledgment of an employee resignation.

Managerial evaluations 80, in an alternate preferred embodiment of the present invention, provide performance appraisals and reviews that are associated with performance capabilities data sets. The content of such performance appraisals and reviews may be limited through the customization system 54 to permit viewing and modification subject to login or login-group based permissions. As with the primary information collected from applicants 74, employees 76, and members of the reserve talent pool 78, such secondary information can be subjected to review by higher-level managerial members of the workforce as well as treated as scorable data.

For the preferred embodiments of the present invention, a performance capabilities data set includes multiple subsets of data. The primary subsets, as utilized in a preferred embodiment of the present invention, include:

Basic Profile: captures basic identifying information specific to an applicant 74, employee 76, or member of the reserve talent pool 78. In addition to simple data entry fields, fields permit entry of information relating to personal and professional goals, including lifestyle preferences, current career path and future goals. The specific information collected and the provided choices for categorized information is dependent on the nature and form of the organization using the HCM system 12. Exemplary basic profile information includes the name, address and other contact information of the applicant 74, employee 76, or member of the reserve talent pool 78. Additional exemplary information collected can include categorized choices of type of employment and type of profession desired, salary requirements, choice of work location and availability for telecommuting, commute and travel availability or restrictions, desired or required work hours and shifts, and departmental work preferences. In a preferred embodiment of the present invention, the HCM system 12 includes a text capture facility that supports transfer of a conventional resume document into a free-text field. The contents of conventional candidate resumes can thus be made directly accessible for free-text searching and viewable in connection with the review of the corresponding performance capability data set, which is particularly beneficial to managerial-level reviewers. An exemplary but not exhaustive listing of basic profile information, as collected in a preferred embodiment of the present invention, is provided in Table I:

TABLE I

Exemplary Basic Profile Fields

| Field | Field Type/Scoring | Options/Descriptions |
|---|---|---|
| Name | Text Field; unscored | (free-text data entry) |
| Address | Text Area; unscored | (free-text data entry) |
| Work Status (H1B) | List; unscored | Any employer<br>Current employer only<br>Require sponsorship |
| Employment type | List; unscored | Full time<br>Part time<br>Contract<br>Intern<br>Voluntary<br>Temporary<br>Job Share |
| Profession type | List; unscored | Administration<br>Labor<br>Management<br>Professional<br>Skilled Craft<br>Technical<br>Other |
| Future Goals | Text Area; unscored | (free-text data entry: "Use keywords you want to be applied to your future experience.") |
| Relocate? | Radio button; unscored | Yes<br>No |
| Industries Interest | List; unscored | Accounting<br>Admin/Secretary<br>Advertising<br>. . .<br>Education/Training<br>Engineering<br>Finance/Banking<br>. . .<br>IT/Computers<br>Insurance<br>Internet/Media<br>. . .<br>Services/Support<br>Telecom<br>Trades/Labor<br>Transportation/Logistics |
| Experience areas | Text Area; scored | (free-text data entry: "Type any key words that can be applied to your experience") |
| Awards | Text Area; unscored | (free-text data entry: "Awards, certifications, scholastic awards") |
| Seminars | Text Area; unscored | (free-text data entry: "Seminars, workshops, etc.") |
| Affiliations | Text Area; unscored | (free-text data entry: "Clubs, affiliations, professional memberships, associations") |
| Publications | Text Area; unscored | (free-text data entry: "Articles, books, other published works") |

Performance History: captures information describing the position and project history of an applicant 74, employee 76, or member of the reserve talent pool 78. In the preferred embodiments of the present invention, the information is captured on a per company/job basis, with each company/job specified being expanded to capture corresponding specific information. Modest to extensive information can be collected. Exemplary basic information collected includes company and division/department name and job title. Categorized fields support identification of type of business, salary range, years employed, budget responsibility, managerial responsibility, and number of employees and vendors managed. Categorized fields preferably also permit identification of any lifetime benefits, or benefits a person has from a previous position. Exemplary performance history information, as collected in a preferred embodiment of the present invention, is listed in Table II:

TABLE II

Exemplary Performance History Fields

| Field | Field Type/Scoring | Options/Descriptions |
|---|---|---|
| Company | Text Field; unscored | (free-text data entry) |
| Current Employer? | Radio button; unscored | Yes<br>No |
| Prev. Positions | Text Area; unscored | (free-text data entry: "Please enter up to four more additional titles you have had with this company separating each title with a comma") |
| Accomplishments | Text Area; unscored | (free-text data entry: "Significant position related accomplishments") |
| Reports | Text Area; unscored | (free-text data entry: "Major reports, paper, documents") |
| Projects | Text Area; unscored | (free-text data entry: "Describe the type of projects managed") |

Skills Profile: captures a detailed identification of a person's different skills and competency levels. The top-level skills areas addressed in the presently preferred embodiment of the present invention broadly include education, language, industry, computer, sales, and professional skills.

Education Skills: categorized fields permit identification of college and university degrees and course work, workshops, training schools, trade schools, and computer and technical schools, as well as years of study and degree/certificate received. Exemplary education skills information, collected in a preferred embodiment of the present invention, is listed in Table III:

TABLE III

Exemplary Education Skills Fields

| Field | Field Type/Scoring | Options/Descriptions |
|---|---|---|
| Institution | Text Field; unscored | (free-text data entry) |
| Education Type | List; scored | Computer Technical College<br>Continuing Education<br>Doctorate School<br>Graduate School<br>Junior College<br>Seminar/Workshop<br>Technical College<br>Trade School<br>Undergraduate |
| Degree | Text Field; scored | (free-text data entry: "Name of Degree/Certificate received") |

Language Skills: categorized fields permit identification of basic language competencies, such as reading, writing and speaking ability for each of potentially multiple languages. Exemplary language skills information, collected in a preferred embodiment of the present invention, is listed in Table IV:

TABLE IV

Exemplary Language Skills Fields

| Field | Field Type/Scoring | Options/Descriptions |
|---|---|---|
| Language | Text Field; unscored | (free-text data entry) |
| Skill Level | List; scored | Speak/read/write |
| | | Speak Only |
| | | Read Only |
| | | Speak and Read |
| | | Read and Write |

Industry Skills: in the preferred embodiment of the present invention, industry skills are used to identify specialized trade competencies, and are qualified by a combination of categorized and free-text files to identify the industry in which the skill was acquired, the number of years involved in acquiring the skill, and to permit detailed description of the specific skills, accomplishments, awards, and other honors related to the industry skill. Exemplary industry skills information, collected in a preferred embodiment of the present invention, is listed in Table V:

TABLE V

Exemplary Industry Skills Fields

| Field | Field Type/Scoring | Options/Descriptions |
|---|---|---|
| Industry | List; scored | Accounting |
| | | Aerospace |
| | | Auditing |
| | | . . . |
| | | Chemicals |
| | | Computer/Hardware |
| | | Computer/Software |
| | | . . . |
| | | Human Resources |
| | | Information Technology |
| | | Insurance |
| | | . . . |
| | | Research |
| | | Restaurant |
| | | Retail |
| | | Sales |
| | | . . . |
| Years | List; scored | Less than 1 year |
| | | 1-2 years |
| | | 3-5 years |
| | | 5-10 years |
| | | Over 10 years |
| Skill set | Text Area; scored | (free-text data entry: "Describe how you used the skill(s) in the industry selected") |

Computer Skills: fields support the identification of experience with networking systems, operating systems, hardware, and software. Categorized fields support identification of particular skills and years of experience in the development of the skill. Free-text fields are provided to permit detailed description of particular projects or experiences relevant to how the skill was gained and used. Free-text searches and managerial review of these free-text fields enables a tighter selection of potential candidates and a basis for rapid, effective, initial review of such candidates. Thus, a broad search for candidates based on an unqualified search term "C++" may return both sales and technical candidates, while constraining the search to "C++" within the project field of software computer skills, a much more limited set of candidates, effectively only programmers with the relevant skills, are identified. Exemplary computer skills information, collected in a preferred embodiment of the present invention, is listed in Table VI:

TABLE VI

Exemplary Computer Skills Fields

| Field | Field Type/Scoring | Options/Descriptions |
|---|---|---|
| Skill | Test Field; scored | (free-text data entry; "Key or common name of a software package or hardware system") |
| Years | List; scored | Less than 1 year |
| | | 1-2 years |
| | | 3-5 years |
| | | 5-10 years |
| | | Over 10 years |
| Skill Level | List; scored | Familiar |
| | | Novice |
| | | Intermediate |
| | | Advanced |
| | | Expert |
| Project | Text Area; scored | (free-text data entry: "Describe how you used the skill and the projects where the skill was used") |

Sales Skills: categorized fields permit identification of products or services sold, years of experience, type of sales, quota information and compensation type. Free-text fields are provided to permit further identification of any relevant sales skills, accomplishments or awards received. Exemplary sales skills information, collected in a preferred embodiment of the present invention, is listed in Table VII:

TABLE VII

Exemplary Sales Skills Fields

| Field | Field Type/Scoring | Options/Descriptions |
|---|---|---|
| Product/Service | Test Field; scored | (free-text data entry; "Key or common name of the product/service sold") |
| Years | List; scored | Less than 1 year |
| | | 1-2 years |
| | | 3-5 years |
| | | 5-10 years |
| | | Over 10 years |
| Sales Type | List; unscored | Inside |
| | | Outside |
| | | Both |
| Quota Type | List; unscored | Daily |
| | | Weekly |
| | | Monthly |
| | | Quarterly |
| | | Yearly |
| | | None |
| Quota Attained | List; scored | 0-10% |
| | | 11-20% |
| | | 21-30% |
| | | 31-40% |
| | | . . . |
| | | 91-100% |
| | | 101-110% |
| | | 111-120% |
| | | Over 120% |
| Compensation | List; unscored | Salaried |
| | | 100% commission |
| | | 50/50 combination |
| | | 60/40 combination |
| | | . . . |
| | | 90/10 combination |
| Project | Text Area; scored | (free-text data entry: "Describe your special sales skills, accomplishments and awards") |

Professional Skills: category fields are provided to permit entry of specific work experience, knowledge and training, certifications, and degrees and other professional qualifications received. Categorized fields can be provided to permit entry of specific professional qualifications, which are prerequisites for specific, typically professional positions, or required for maintenance of a typically professional position, such as mandatory continuing education credits. Free-text fields can be provided to permit entry of license renewal dates and requirements, as well as further detailed descriptions of professional capabilities. Such fields can be used for free-text searches to support detailed identification of qualified candidates. Category fields for professional career path choices can also be provided. Such fields can be used as a basis for identifying the requirements that must be met by a candidate to progress to the identified career choice position or level. Exemplary professional skills information, collected in a preferred embodiment of the present invention, is listed in Table VIII:

TABLE VIII

Professional Skills

| Field | Field Type/Scoring | Options/Descriptions |
| --- | --- | --- |
| Work Experience | ListChooser: scored | Access 2000 |
| | | Crystal Reports |
| | | Data Analysis/Data Modeling |
| | | Database Design |
| | | ... |
| | | SQL |
| | | VBScript |
| | | Windows NT/2000 |
| | | XML |
| Work Level | List; scored | Familiar |
| | | Novice |
| | | Intermediate |
| | | Advanced |
| | | Expert |
| Knowledge | ListChooser; scored | Computers |
| | | C++ |
| | | Design Patterns |
| | | Data Mining |
| | | ... |
| | | Object Oriented Programming |
| | | Risk Management |
| | | Software Development |
| | | Windows APIs |
| Knowledge Level | List; scored | Familiar |
| | | Novice |
| | | Intermediate |
| | | Advanced |
| | | Expert |
| Diplomas/Certs. | ListChooser; scored | A.A. Business |
| | | A.A. Computer Science |
| | | B.A. Mathematics |
| | | ... |
| | | Oracle DBA Certificate |
| | | Web Developer Certification |
| | | Windows Admin. Certification |

In accordance with the present invention, the different items within the performance capability data set, and those of the skills subset in particular, can be qualified by categorized rankings. In the preferred embodiments of the present invention, multiple different ranking sets are stored within the workforce database 32. Ranking sets are associated as sets of categorized field option choices where contextually appropriate. Thus, a ranking set including the elements "required," "preferred," and "optional" may be associated with both a categorical field for choosing between full-time and part-time positions and a field for salaried, hourly, and voluntary work. A ranking set of "expert," "advanced," "intermediate," "novice," and "familiar" can be associated with category fields specifying an expertise in specific software, sales, and other skills.

Figure 5:
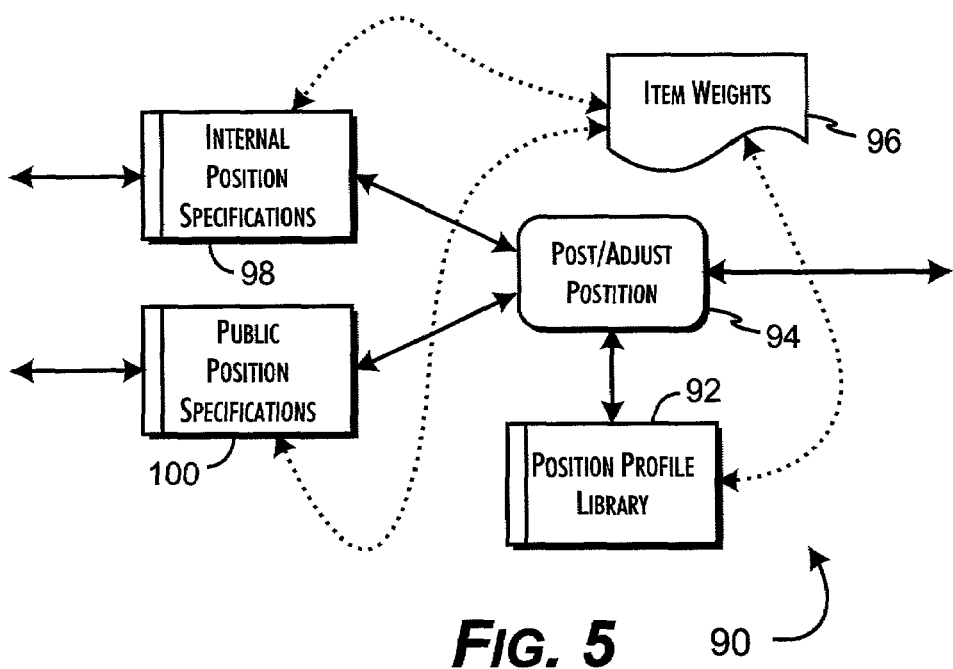
FIG. 5 provides a block diagram illustrating multiple position data stores and the relationships between position requirements and a weighting system established in a preferred embodiment of the present invention.

The HCM system 12, as illustrated in FIG. 5, provides a system 90 that supports the preparation and posting of performance capability specifications representing open positions within an organization. These position specifications may be copied or adapted from preexisting position profiles stored managed as a library 92 within the position bank database 22. Position profiles and specifications are preferably sets of performance capability items, including relevant ranking levels, that represent a performance capabilities set most appropriate for a corresponding position within the organization.

The HCM system 12 process management application 56 preferably supports a posting process 94 enabling the creation of a position profile directly or based on an existing position profile. When created or modified, item weighting values, stored in an item weights table 96, are associated with each performance capability item within a position specification. Item weights are also preferably associated with the different ranking levels that may be specified as qualifying the different performance capability items within the position specification.

In accordance with a preferred embodiment of the present invention, the posting process 94 permits the position specification to be presented for consideration either internal to the organization or publically. An internal posting is supported by placement of the position specification data set in an internal posting table 98 within the position bank database 22. The permissions attributes on the internal posting table 98 limit viewing access to those applicants 74, employees 76, and members of the reserve talent pool 78 that are considered to be internal by the relevant workforce organization. A second, public posting table 100 is preferably provided with permissions permitting a broader range of viewing access by applicants 74, employees 76, and members of the reserve talent pool 78. The posting process of the HCM system 12 process management application 56 preferably permits position specifications to be automatically or manually moved between the position posting tables 98, 100.

Figure 6:
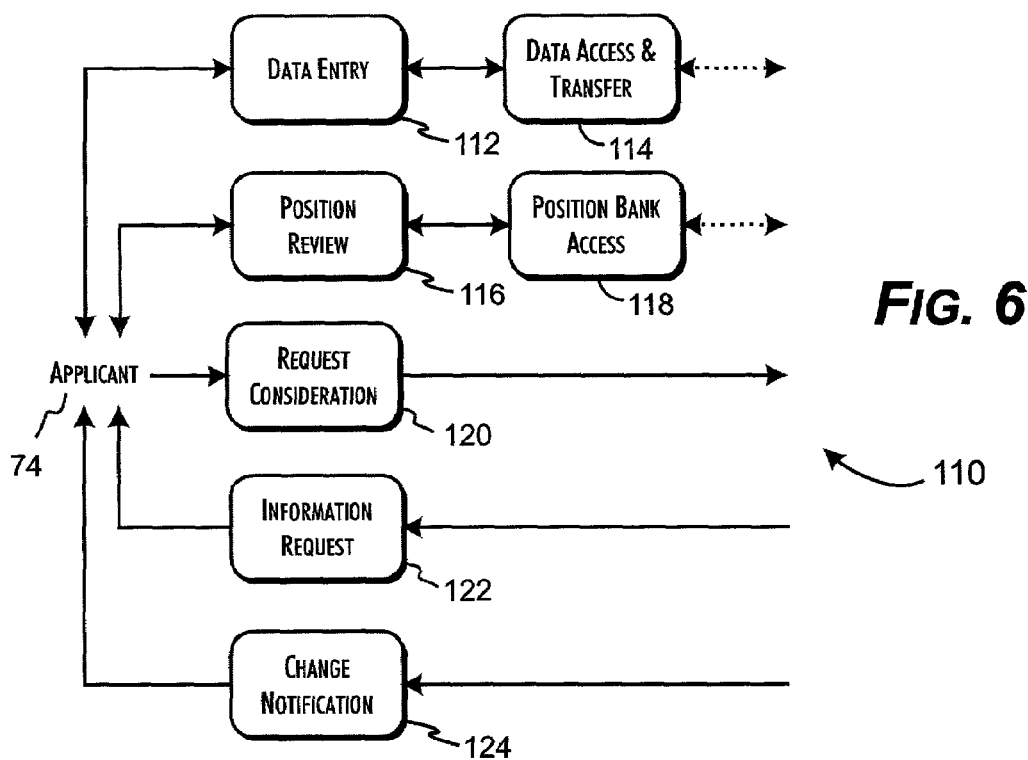
FIG. 6 is a flow diagram illustrating applicant-side interactions with the human capital management information system of the present invention.

A preferred user interface process 110, supported by the HCM system 12 process management application 56, is shown in FIG. 6. Applicants 74, employees 76, and members of the reserve talent pool 78 are provided data entry screens 112 that support the creation and modification of their performance capabilities data set. Data entry is supported by transfers of data 114 to and from the HCM repository database 20. The applicants 74, employees 76, and members of the reserve talent pool 78 can also review 116 the position specifications present 118 in the internal and external position tables 98, 100, subject to the table access restrictions. A request for consideration 120 can be submitted to the HCM system 12 process management application 56 relative to a viewable posted position specification.

The user interface process 110 also supports the reporting of requests for information 122 and status change notifications 124 to specific applicants 74, employees 76, and members of the reserve talent pool 78. Requests for information may be presented as a list of notices available upon login. The requests can also be issued via electronic mail to an address provided as part of the basic profile within the performance capabilities data set. In the preferred embodiments of the present invention, the requests for additional information may be generalized or can be associated directly with particular performance capability items of a user's performance capability data set.

Status change notifications 124 can be similarly provided as part of the login notice list and issued as electronic mail. Status change notifications 124 preferably advise the recipient primarily of employment related events, such as the acceptance or declining of a request for a position change by a candidate applicant 74, employee 76, and member of the reserve talent pool 78.

Figure 7:
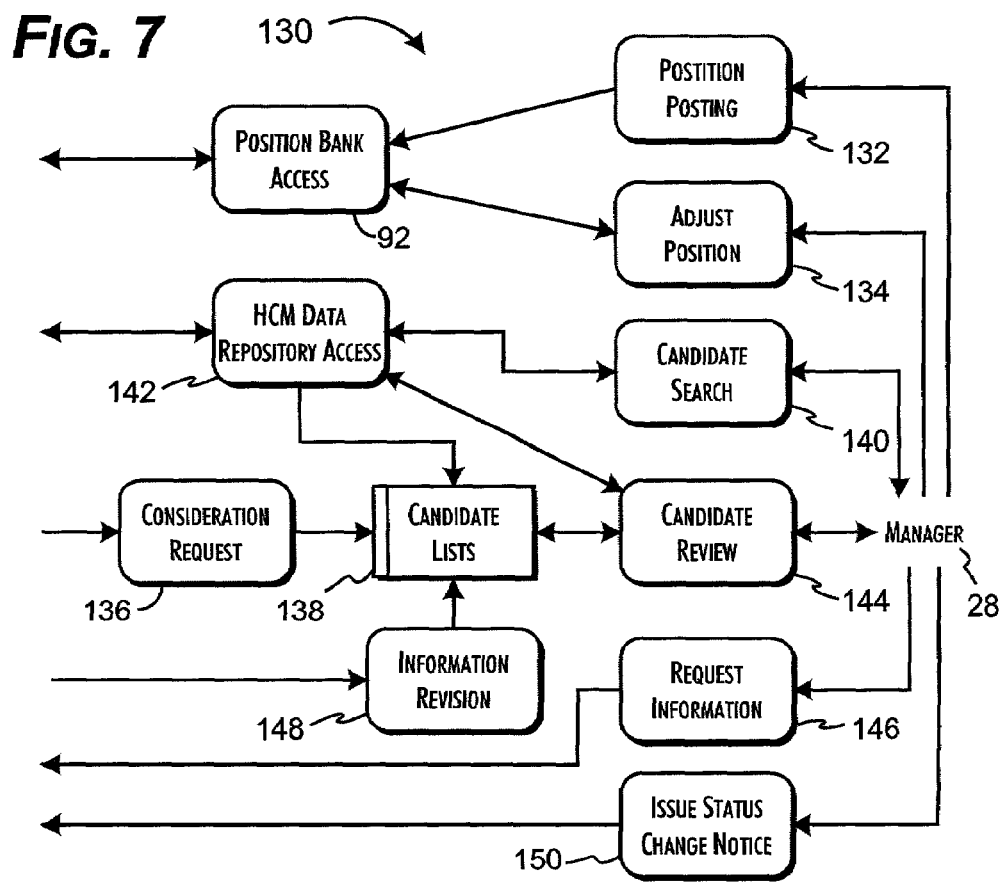
FIG. 7 is a flow diagram illustrating management-side interactions with the human capital management information system of the present invention.

FIG. 7 illustrates a preferred manager interface process 130, as supported by the HCM system 12 process management application 56. The interface process 130 preferably supports multiple methods of identifying potential candidates for positions. A manager 28 or other managerial-level reviewer can post 132 and, as needed or desired, tailor 134 the selection of performance capability items specified in position specifications provided in the positions bank database 22. The posting of position specifications effectively solicits position consideration requests 136 identifying potential candidates. An electronic list 138 of such candidates is maintained and viewed through the interface process 130.

A manager 28 can also perform a direct search against the data sets stored by the HCM repository database 138. In the preferred embodiments of the present invention, the manager 28 is permitted to specify a logical combination of performance capabilities, including minimum requirements and optional skill qualifier rankings, as search criteria 140 against the HCM database data sets. Categorized search terms are applied to the categorized fields of the data sets, while free-form search terms are applied through a free-text search engine against the free-text fields of the data sets. Potential candidates identified by the search results 142 are returned and presented to the manager 28 as part of the candidate list 138. The manager 28 may then review 144 the individual candidates presented in the list 138. Requests for information can be issued 146 to candidates and notifications received 148 when the corresponding data sets are updated. Finally, status change notifications can be issued 150 to notify clients, as appropriate, of acceptance or rejection for a position.

In accordance with the present invention, a highly flexible scoring system is implemented to provide a basis for the screening and ordered evaluation of candidates for a position. The scoring system may also be utilized in the managerial-level review of the information initially and subsequently provided by applicants 74, employees 76, and members of the reserve talent pool 78 as part of the feedback process of ensuring the integrity of the data provided.

Figure 8:
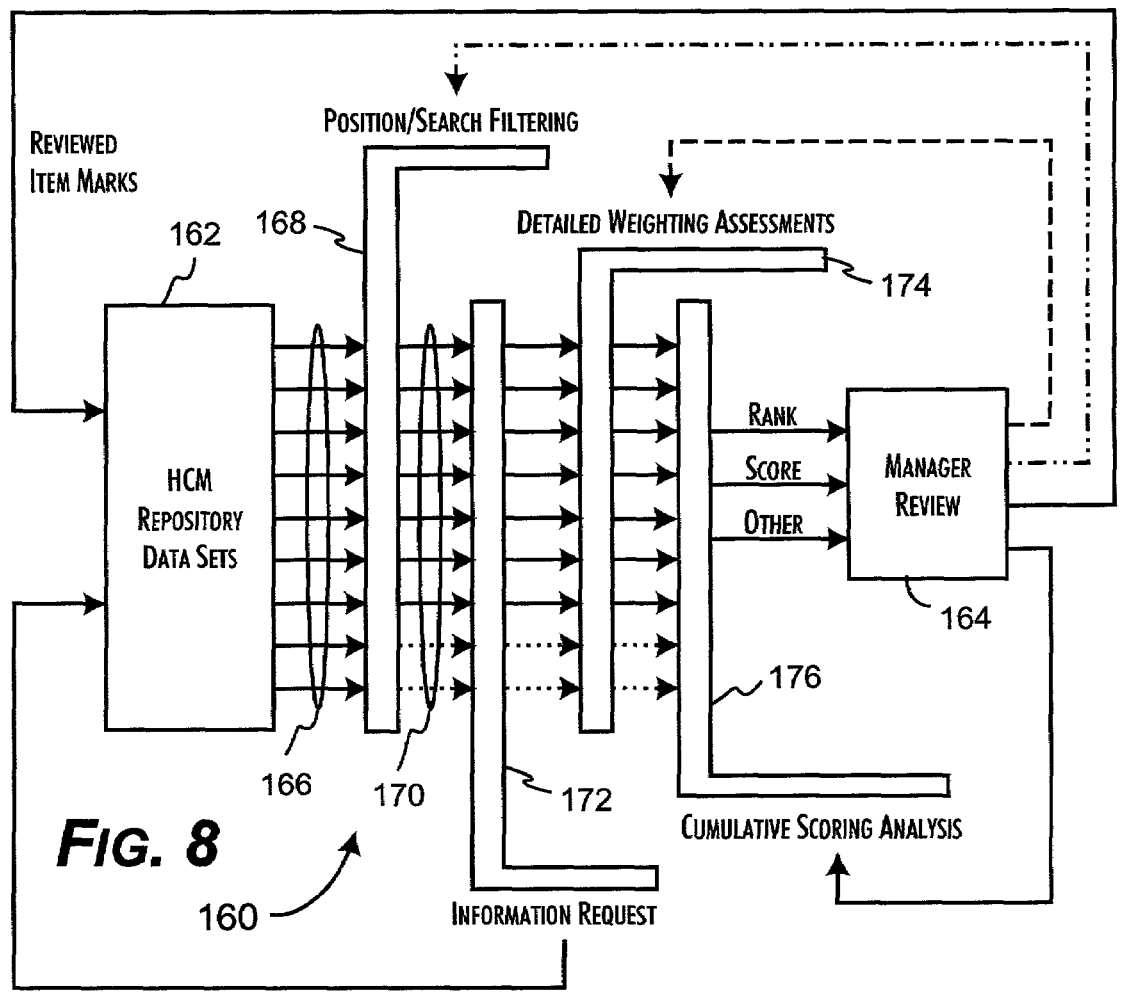
FIG. 8 provides a block diagram illustrating the evaluation process associated with the scoring, presentation, and evaluation of various performance capabilities in accordance with the present invention.

As shown in FIG. 8, a scoring system 160 provides for the evaluation of candidate HCM repository data sets 162 and ultimately produces a score based ranking of the candidates for consideration by a manager in review of the candidate list 138. In the preferred embodiments of the present invention, in response to a manager defined criteria data set search or evaluation of candidate data sets against a position specification, the individual performance capability items 166 of a candidate data set are matched 168 against the equivalent performance capability items specified in the position specification or search criteria.

The matching operation 168 filters out data sets that are incompatible with the requirements of the position specification or a criteria-based search request, such as where a position specification requires a particular skill and the data set reflects no such skill. Conversely, skills and other performance capabilities 166 present in the data set, but not specified as part of the position specification or search criteria remain as potential components 170 of the data set score. In an alternate embodiment of the present invention, a position specification may also identify performance capability items that are not to be considered as part of the scoring of data sets.

Filtered data sets 170 may then be reviewed for consistency and completeness, either automatically as part of a pre-screening process performed automatically by the HCM system 12 process management application 56 or manually by a human resources screening reviewer or by the manager 28. Requests for missing, incomplete, or other information nominally desired as part of a data set suitable for managerial-level review is requested 172 from the corresponding applicant 74, employee 76, or member of the reserve talent pool 78.

The numeric values corresponding to the performance capability items of filtered data sets 170 are then weighted 174 based on the weights associated with the items of the position specification or search criteria. In the preferred embodiments of the present invention, item weights are directly associated, from the item weights table 96, with the items of a position specification. The weights associated with categorized and free-text search criteria items can be either a common fixed constant, thereby producing no differential weighting of the performance capabilities, or weighting values expressly defined as part of the search specification. In the preferred embodiments of the present invention, the weighting values are added to the corresponding item scores to derive a final score for each particular performance capability item. Thus, a final item score is the sum of the base numeric value, the value of the ranking qualifier, if any, a managerial review value, and the weight value associated with the item. While the numerical values are preferably empirically determined based on the nature of the workforce represented in the data sets stored by the HCM system 12, as a typical example, a basic sales skill may be intrinsically valued as 20 points on a scale of 1 to 100, while a technical computing skill may be valued as 35 points, standard ranking qualifiers of novice, intermediate, advanced, and expert accorded values of 2, 5, 8, 12, and managerial review concurrence a value of 10. For this example, weighting values are also assigned in a range from 1 to 100, depending on the desirability of any particular performance capability item and any associated skill level. In alternate preferred embodiments, other combinatorial and weighting functions may be used to alter the proportionality of the final item score based on the combination of the base and ranking values, further qualified by the weighting value.

The individual final item scores are preferably accumulated 176 and used as a basis for ranking the candidates identified in the list 138. The accumulated final scores for the identified candidates may also be shown. In alternate embodiments of the present invention, other score-based analysis information may also be displayed, particularly to aid in recognizing the most desirable candidates during the managerial review 164. Statistics may be generated to illustrate the closeness of the match between a candidate skill set and the position specification or search criteria. Other figures of merit may be produced reflecting the breadth or strength of skills held by the candidate.

The managerial review 164 is, in accordance with the present invention, an interactive process. The managerial-level reviewer can examine the detailed data sets corresponding to the candidates identified in the list 138. Position specification and search criteria can be adjusted, the weighing values assigned to different performance capability items can be altered, and, at least in an alternate embodiment of the present invention, the scoring functions and cumulative analysis processes can be specified and adjusted. Also, in at least an alternate embodiment of the present invention, the scores attributable to performance capability items outside of the position specification or search criteria can be selectively chosen through the manager review 164 for inclusion in the ranking of candidates or shown separately as alternate ranking values. The choice of statistical and cumulative analysis can also be interactively changed. These iterative review processes permit the managerial-level reviewer to comprehensively consider the skills and potential capabilities of candidates for a position.

Figure 9:
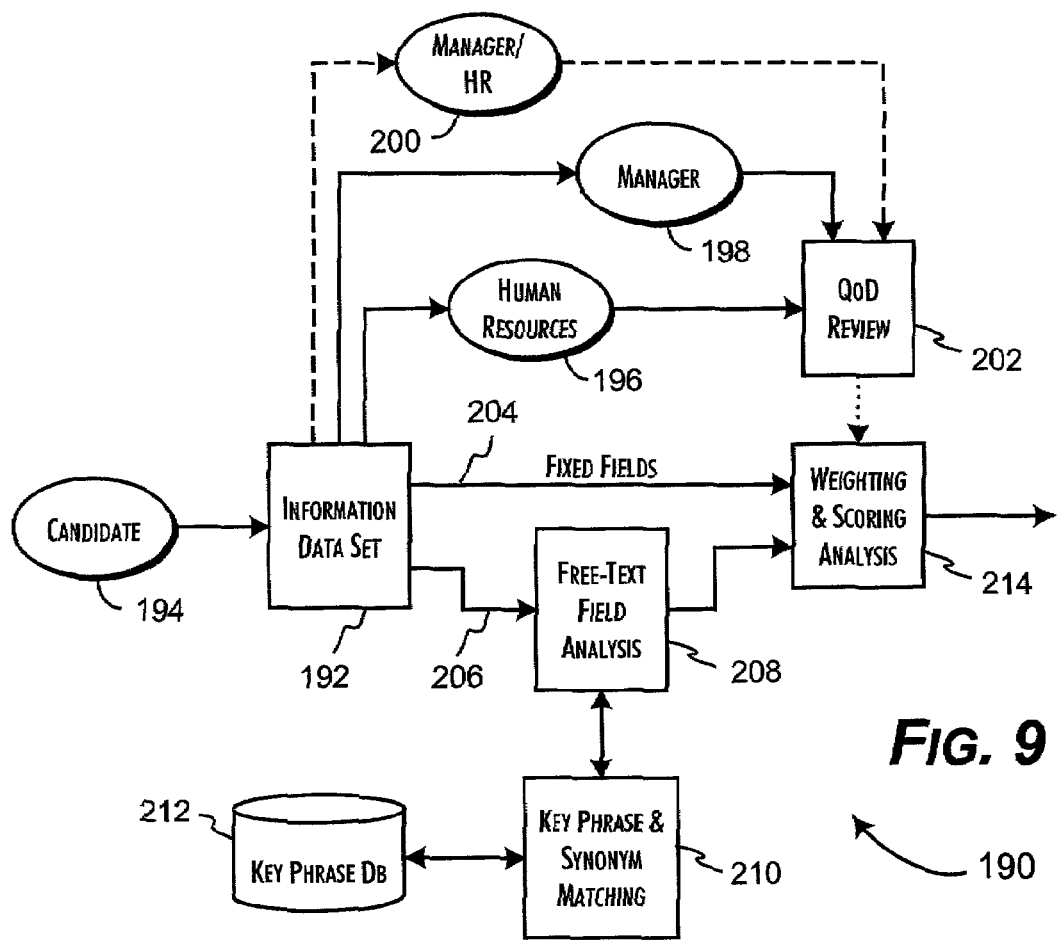
FIG. 9 is a system block diagram detailing the scoring system as implemented in a preferred embodiment of the present invention.

As part of the scoring of categorized performance capability information, the present invention provides for the scoring of the information presented in the free-text fields in a compatible manner. In anticipation of the scoring of free-text information, the system and process of the present invention, as shown in FIG. 9, particularly provides for the detailed review of both categorized and free-text information provided as part of a candidate performance capability data set. The data set information 192 provided by a candidate 194 may be screened initially by a human resources reviewer 196 for completeness and potentially for objective accuracy, such as through the checking of references. Thus, screening by the human resources reviewer 196 is particularly beneficial where candidate 194 is an applicant 74 with no or limited prior contact with the workforce organization.

Managerial-level review 198 preferably provides for a performance capability item by item review of the data set information for substantive, including subjective, accuracy. In the preferred embodiments of the present invention, the managerial review 198 considers, in particular, whether the identification of performance capability skills listed as held and any skill level rankings assessed by the candidate 194 are reasonably accurate within the knowledge of the manager reviewer 198. Where a question arises or clarification is desired, such is solicited from the candidate 194, which may result in a modification of the performance capability data set.

Optionally, a further managerial-level or other skilled human resources review 200 can be performed relative to the managerial-level review 198 as a final or statistical check on the reasonable uniformity and subjective quality of managerial-level reviews 198. The result of such reviews 200 is preferably to inform and thus normalize a subjective baseline for use by the managerial-level reviewers 198.

In accordance with the present invention, the performance of each of the reviews 196, 198, 200 may be reflected into the information data set 192 as a basis for subsequently assessing the quality of the information provided by the data set. In particular, and in the preferred embodiments of the present invention, the approval of the reasonableness of the identification of performance capability skills held and any skill level rankings assessed by the candidate 194 may be approved or disapproved through the managerial-level review 198 on an item by item basis. The approval of a performance capability item is preferably marked 202 in the data set information 192 against the corresponding performance capability item for subsequent consideration in scoring the information data set 192.

In the preferred embodiments of the present invention, the categorized 204 data set information has explicitly associated numerical score values. In order to extract compatible scorable information from the free-text 206 information, the contents of each scored free-text field is preferably subjected to an analysis 208 to extract and identify scorable information. In the presently preferred embodiments of the present invention, the contents of a free-text field being analyzed is parsed into a list of presumptively key words and phrases. These words and phrases are then sequentially matched 210 against a key phrase database 212, preferably implemented as part of the workforce database 32, containing an established list of skill names, short skill descriptions, and commonly recognized skill word and phrase synonyms.

In accordance with the present invention, list contained by the key phrase database 212 is not merely a static, predefined listing of skill related words and phrases. Rather, the key phrase database 212 is maintained as a dynamic, evolving representation of newly developing skills and the equally evolving nomenclature used to describe both new and existing skills. The contents of the key phrase database 212 equally evolves to track the changing nomenclature used to describe activities and achievements that are or may be relevant to the consideration of candidates.

The contents of the key phrase database 212 are preferably updated continually at least as part of the managerial review process 198. In reviewing the terms used in free-text data set fields of a candidate data set, the managerial-level reviewer 198 can request, and potentially suggest, the use of conventional industry terminology that may already be reflected in the contents of the key phrase database 212. Conversely, where the terms used may represent an evolved description of some performance capability, the managerial-level reviewer 198 preferably adds the term or terms to the key phrase database 212. The added terms are thus available for use in the subsequent scoring of information data sets.

Key word and phrase matches are preferably reported through the field analyzer 208 for weighting and scoring analysis 214 in combination with the categorized fields of the information data set 192. In accordance with the present invention, the skill names, short skill descriptions, and common skill word and phrase synonyms are pre-assigned score values. These terms may be further associated with corresponding categorized performance capability items for purposes of recognition against search criteria, for matching against position specifications, and cumulative scoring. Thus, in the preferred embodiments of the present invention, a matched term score value is included or added with the score value of an associated categorized performance capability item. The content of the free-text information provided by a candidate 194 therefore directly participates in the ranking of the candidate 194 within a list 138.

Figure 10:
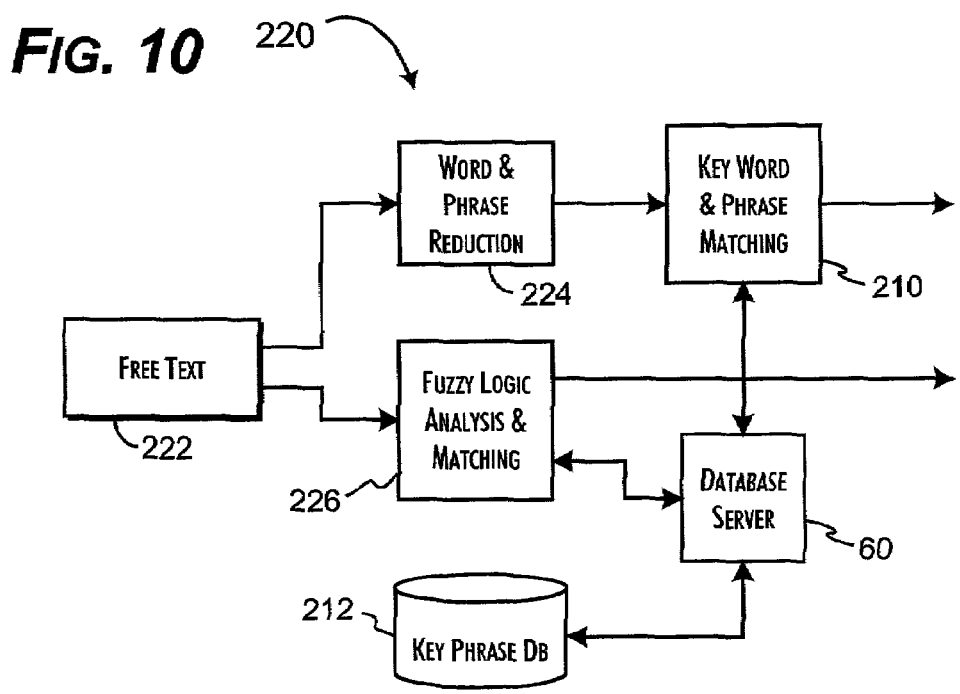
FIG. 10 is a detailed block diagram showing alternate free-text field content scoring systems consistent with the present invention.

Preferred and alternate systems 220 for identifying information within the content of free-text fields is shown in FIG. 10. In the preferred embodiment of the present invention, the content of a free text field 222 is first lexically reduced 224 to word and short phrase sequences and then stemmed to normalize word and phrase tense and remove words with no contextual content, such as conjunctions and pronouns. A database lookup, through the database server 60 against the key phrase database 212, is then performed for each word and phrase. The database lookup preferably returns a null indicating no match or the name of a categorized performance capability item that corresponds directly or as a synonym of the key word or phrase. The name of the matched categorized performance capability item is then passed back for weighting and scoring analysis 214.

An alternate system for identifying significant information from the content of a free-text field may use a fuzzy-logic processor, a neural network, or other rule or knowledge-based inference engine 226. The underlying knowledge base for the engine 226 is again preferably stored and retrieved from the key phrase database 212, though in a form most appropriate for use by the engine 226. The product of the engine 226 is also again a name of a categorized performance capability item that can be used in the weighting and scoring analysis of the information data set 192.

Thus, a system and method for providing for the closed-loop capture and maintenance of human capital management information with a high-degree of integrity and for evaluating such information in response to applied search criteria and against position specifications has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method for implementing a talent management system, executed on a computer system, providing for the collection and qualification of performance capability information of workforce candidates, including currently active participants and a reserve talent pool of inactive participants, and for the evaluation of workforce candidates to support selection of candidates for positions within an organization, said method comprising the steps of:
   a) collecting, via a user interface system, and storing, in a workforce database, performance capability information from said workforce, wherein said workforce includes a plurality of members and wherein said performance capability information identifies a workforce participant and the participant status of said workforce participant, and includes a plurality of performance capability partitions, and wherein each said performance capability partition includes categorized field information and categorized free-text information, said categorized free-text information including unstructured textual content, said performance capability information being stored in a workforce database, with respect to said plurality of members, as a plurality of performance capability data sets;
   b) automatically generating first scores for said plurality of performance capability data sets, wherein said first score of each said data set includes assigning score values to respective instances of said categorized field information and sets of score values to respective instances of said categorized free-text information, wherein for each instance of categorized free-text information said instance of categorized free-text information is autonomously parsed relative to the category of said instance of categorized free-text information to identify capabilities identifiers including one or more words, wherein said instance corresponding set of score values includes score values selectively assigned to said capabilities identifiers, wherein said assigned score values are stored in said workforce database;
   c) reviewing and assigning, by a designated reviewer, second scores to a subset of said plurality of performance capability data sets, wherein said second scores of said subset include weighting values selectively assigned to said score values, wherein each said weighting value represents a qualification of a respective said score value, wherein said step of selectively assigning weighting values includes reviewing the respective instances of said categorized field information and said categorized free-text information by said designated reviewer via a reviewer interface system, coupled to said workforce database, to selectively assign said weighting values, and wherein said assigned weighting values are stored in said workforce database, whereby said step of reviewing and assigning provides for a normalization of the quality of information provided by a corresponding set of workforce candidates; and
   d) selecting, via said reviewer interface system, a candidate for a predetermined position based on evaluation of said plurality of performance capability data sets with respect to said predetermined position, wherein said predetermined position is defined by an associated weighting specification specified through said reviewer interface system and used to determine a corresponding ranking of said performance capability data sets, wherein said weighting specification includes a plurality of specification weights selectively corresponding to said categorized field information and capability identifiers associated with said categorized free-text information, wherein the ranking of a corresponding data set is determined from a combined correspondence of said specification weights and said assigned weighting and score values of the said corresponding data set, and wherein a subset of said plurality of performance capability data sets are displayed in ranked order determined by said combined correspondence;

wherein said user interface system is accessible by said plurality of workforce participants, said user interface system providing for the identification within said performance capabilities data set repository of discrete editing changes made to said plurality of performance capability data sets, said user interface system further providing for the issuance of an information request electronic notification message to a predetermined user corresponding to a predetermined data set, wherein issuance of said information request electronic notification message is initiated by an assigned reviewer to obtain further qualification of said predetermined data set, and wherein said information request electronic notification message communicates a request for specified information regarding an item of said predetermined data set;

wherein said reviewer interface system is accessible by reviewers and enables identification of said discrete editing changes made to said performance capabilities data sets, wherein said workforce database associates a predetermined reviewer with said predetermined performance capability data set, and wherein said predetermined reviewer receives a data changed electronic notification message of said change in said workforce database through said reviewer interface system; and wherein said workforce database is updated with workforce life-cycle event data, separately from said user interface system, to modify participant status of said predetermined user to reflect chances of participant status between active participant status and reserve talent pool inactive participant status.

2. The method of claim 1 wherein said workforce database associates a reviewer notification delivery address with said assigned reviewer and wherein said data changed electronic notification message is delivered to said assigned reviewer at said reviewer notification delivery address.

3. The method of claim 2 wherein said workforce database associates a user notification delivery address with said predetermined user and wherein said information request electronic notification message is delivered to said predetermined user at said user notification delivery address.

* * * * *